US008961191B2

(12) United States Patent
Hanshew

(10) Patent No.: US 8,961,191 B2
(45) Date of Patent: Feb. 24, 2015

(54) ELECTRICAL CONNECTOR FOR PEDAL SPINDLE

(71) Applicant: Garmin Switzerland GmbH, Schaffhausen (CH)

(72) Inventor: Christopher J. Hanshew, Lenexa, KS (US)

(73) Assignee: Garmin Switzerland GmbH (CH)

( * ) Notice: Subject to any disclaimer, the term of this patent is extended or adjusted under 35 U.S.C. 154(b) by 0 days.

(21) Appl. No.: 13/974,960

(22) Filed: Aug. 23, 2013

(65) Prior Publication Data
US 2014/0273543 A1 Sep. 18, 2014

Related U.S. Application Data

(60) Provisional application No. 61/789,517, filed on Mar. 15, 2013.

(51) Int. Cl.
*H01R 39/00* (2006.01)
*H01R 39/64* (2006.01)
(52) U.S. Cl.
CPC ...................................... *H01R 39/64* (2013.01)
USPC ................................ 439/22; 439/21; 439/320
(58) Field of Classification Search
USPC ........................................ 439/18, 21, 22, 320
See application file for complete search history.

(56) References Cited

U.S. PATENT DOCUMENTS

| 7,364,108 | B2 * | 4/2008 | Kim et al. ........................ 439/22 |
| 8,011,242 | B2 | 9/2011 | O'Neill et al. .............. 73/379.01 |
| 2006/0134933 | A1 * | 6/2006 | Huang .............................. 439/22 |
| 2011/0098601 | A1 * | 4/2011 | Huynh et al. .................... 439/18 |
| 2012/0210784 | A1 | 8/2012 | Kokkoneva et al. ............. 73/431 |
| 2013/0244463 | A1 * | 9/2013 | Talavasek et al. ............. 439/260 |

FOREIGN PATENT DOCUMENTS

EP 1661606 A1 5/2006

OTHER PUBLICATIONS

Polar Look Review, dcrainmaker.com, published Jul. 27, 2012.

* cited by examiner

*Primary Examiner* — Tho D Ta
(74) *Attorney, Agent, or Firm* — Samuel M. Korte; Mohammad M. Ali

(57) ABSTRACT

An electrical connector for electronics in a pedal spindle. The electrical connector may have a plurality of concentrically-spaced electrical contact pads and a spindle connector. The electrical contact pads may fit within the pedal spindle and electrically connect to the electronics in the pedal spindle. The spindle connector may have a housing and a plurality of electrically conductive elements, such as pins, extending from the housing. The housing may be sized and shaped to mate with an end of the pedal spindle proximate to the electrical contact pads. The electrically conductive elements or pins may each contact one of the electrical contact pads when the housing is mated with the end of the pedal spindle.

16 Claims, 7 Drawing Sheets

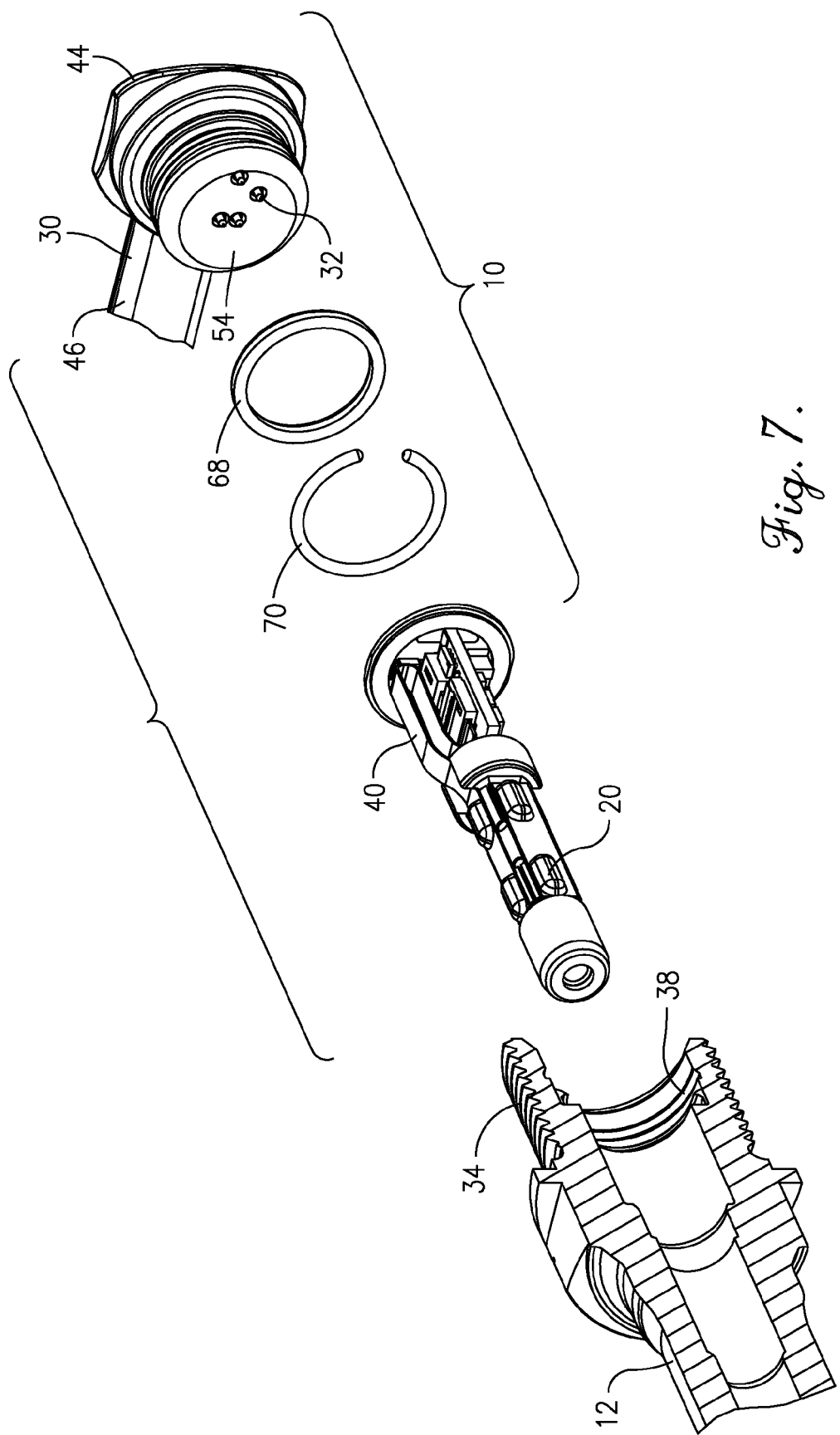

US 8,961,191 B2

ELECTRICAL CONNECTOR FOR PEDAL SPINDLE

RELATED APPLICATIONS

The present application claims the benefit of provisional U.S. Patent Application No. 61/789,517, entitled "Electrical Connector for Rotating Pedal," filed Mar. 15, 2013, which is herein incorporated by reference in its entirety.

BACKGROUND

Success in the sport of cycling depends on both the strength and skill of the rider as well as the physical design of the bicycle. Some modern cyclists use sensors internal or external to their bicycles to track their progress and analyze their technique to improve their cycling skills.

SUMMARY

Embodiments of the present technology provide an electrical connector for electronics in a pedal spindle, such as a bicycle pedal spindle attached to a crank arm. The electrical connector may electrically connect sensors within the pedal spindle with a battery and transmitter outside of the pedal spindle. Electrical connection between the sensors and the power source and wireless transmitter may be made within a threaded portion of the spindle that mates with a threaded hole of the crank arm, fixing the pedal spindle with the crank arm.

Embodiments of the present technology provide an electrical connector that can connect sensors within the pedal spindle with batteries and/or transmitters outside of the pedal spindle regardless of the final installed angle of the pedal spindle when screwed into or otherwise installed on the crank arm. An embodiment of the electrical connector may include a plurality of concentrically-spaced electrical contacts and a spindle connector. The electrical contacts may fit within the pedal spindle and be electrically connected to the electronics in the spindle. The spindle connector may have a housing and a plurality of electrically conductive elements, such as pins, pads, or other elements, extending from or disposed within the housing. The housing may be sized and shaped to mate with an end of the pedal spindle proximate to the electrical contact pads. The housing may also house the power source, wireless transmitter, or other electronics electrically and/or communicatively coupled with the electrically conductive elements or pins. The electrically conductive elements may each contact one of the electrical contacts when the housing is mated with the end of the pedal spindle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein:

FIG. 7 is another fragmentary exploded perspective view of the electrical connector and pedal spindle, illustrating the pins of FIG. 5.

Figure 1:
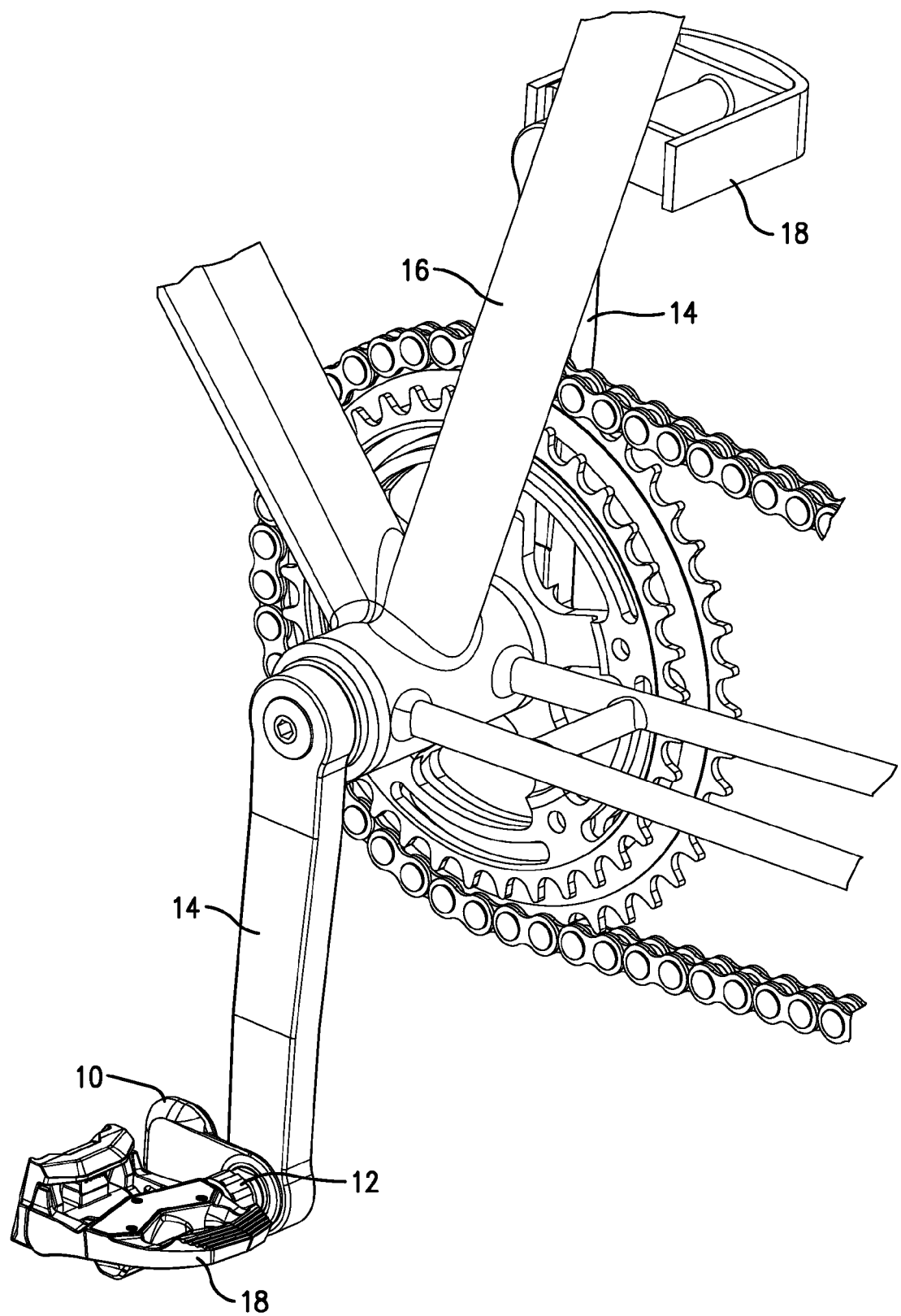
FIG. 1 is a fragmentary perspective view of a bicycle having pedals onto which an electrical connector, constructed in accordance with various embodiments of the present technology, may be attached.
Figure 2:
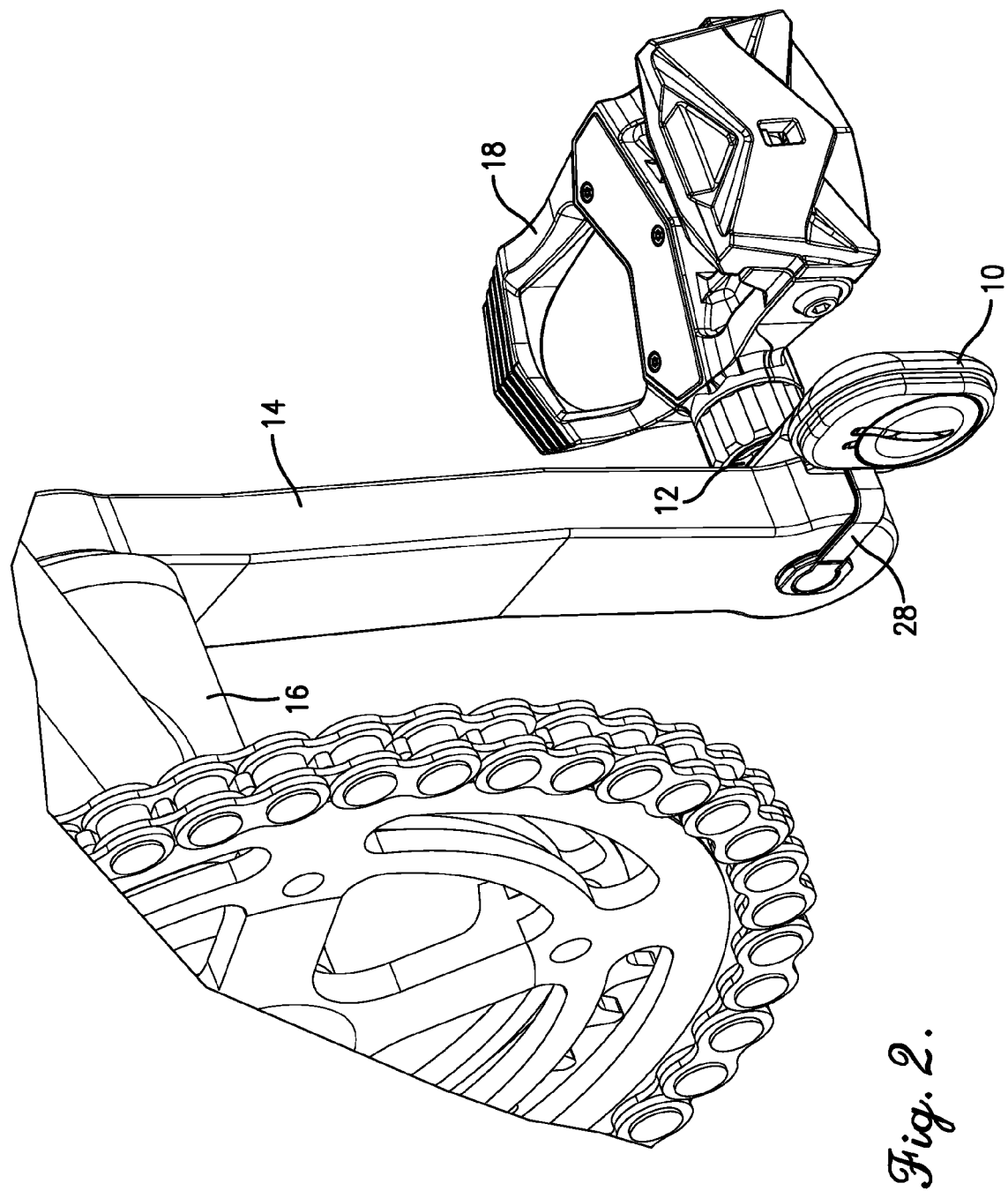
FIG. 2 is a perspective view of the electrical connector attached to a crank arm and pedal spindle of the bicycle of FIG. 1.

The drawing figures do not limit the present invention to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is therefore not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but not necessarily included. Thus, the present technology can include a variety of combinations and/or integrations of the embodiments described herein.

Embodiments of the present technology relate to an electrical connector for attachment to a pedal spindle. U.S. Pat. No. 8,011,242 (filed Jul. 29, 2009), which is incorporated herein by specific reference, discloses a sensor device that may be integrated into a pedal spindle of a bicycle. Such pedal spindle electronics, and other pedal-mounted electronics disposed outside of the pedal spindle, may be used by cyclists to measure pedal forces, movement, and other metrics generated during cycling. However, because the pedal rotates about the bicycle frame via a crank arm, it may be undesirable or impossible to use a simple cable to electrically couple the pedal and the bicycle frame. Furthermore, space constraints within the spindle may make it impossible to mount the sensors, a power source, and a wireless transmitter for sending the sensor readings to a display for the user or to another device. In most cases, the durable material out of which the spindle is made may not allow wireless signals to be easily transmitted therethrough. Embodiments of the present technology provide an electrical connector that can connect sensors within the pedal spindle with batteries and/or transmitters outside of the pedal spindle regardless of the final installed angle of the pedal spindle when screwed into or otherwise installed on the crank arm.

Figure 3:
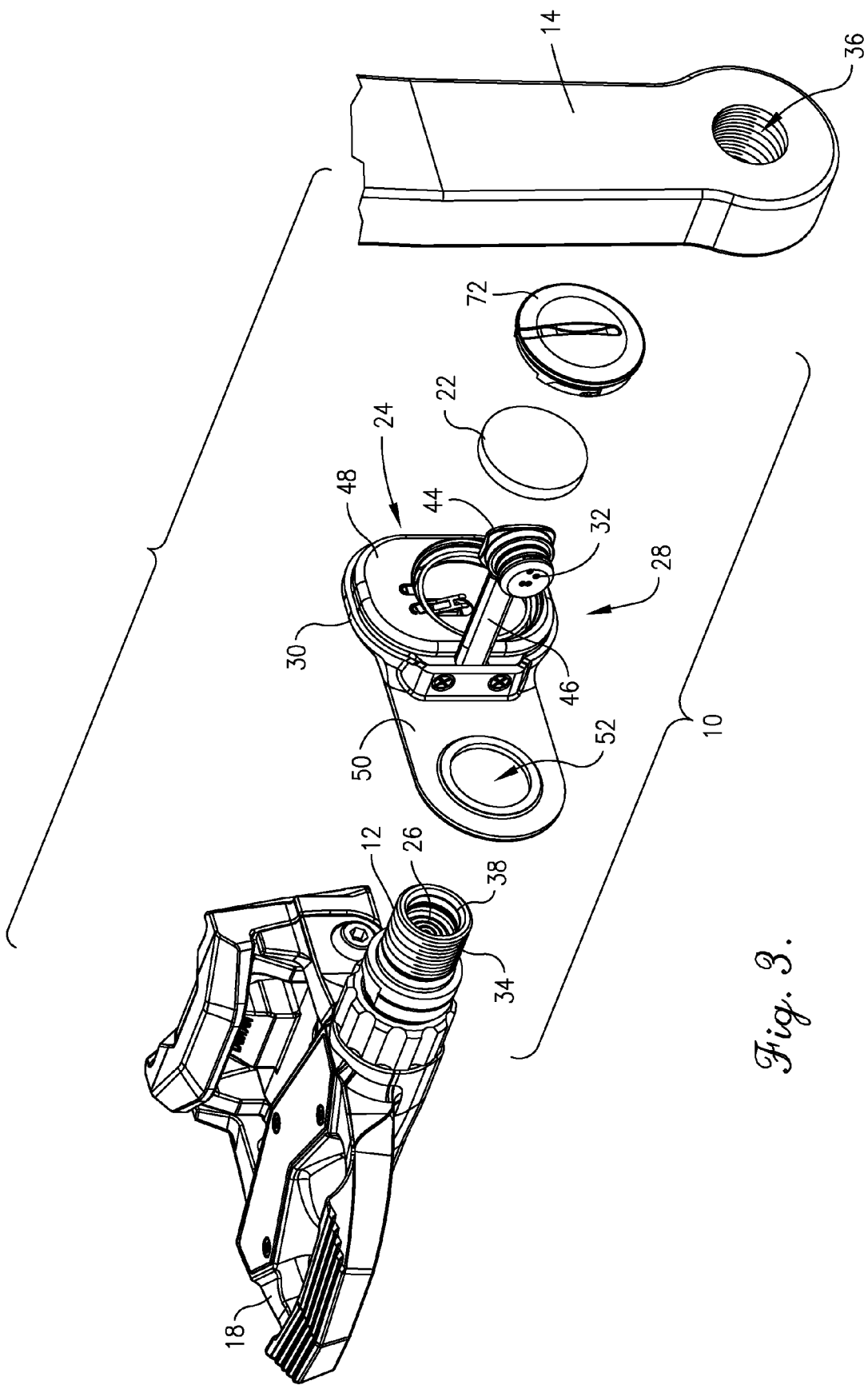
FIG. 3 is an exploded fragmentary perspective view of the pedal spindle, crank arm, and electrical connector of FIG. 2.

Embodiments of the technology will now be described in more detail with reference to the drawing figures. Referring initially to FIGS. 1-7, an electrical connector 10 is illustrated which connects electronics associated with a pedal spindle 12 with other electronics outward of the spindle 12. The spindle 12 may be any pedal spindle known in the art, such as a bicycle pedal spindle, a stationary bicycle spindle, a paddle boat spindle, or the like. For example, as illustrated in FIG. 1, the spindle 12 may be fixed to a crank arm 14 on a bicycle 16, with a pedal 18 is rotatably attached to the spindle 12. As illustrated in FIG. 3, the spindle 12 may have a threaded portion 34 with screw threads formed on an outer surface thereof and the crank arm 14 may have a hole 36 formed therethrough with screw threads formed on an inner surface thereof, such that the threaded portion 34 of the spindle 12 may be screwed into the hole 36 of the crank arm 14. In some configurations, the spindle 12 presents standardized dimensions to enable coupling with conventional crank arms found on commonly-used bicycles.

Figure 4:
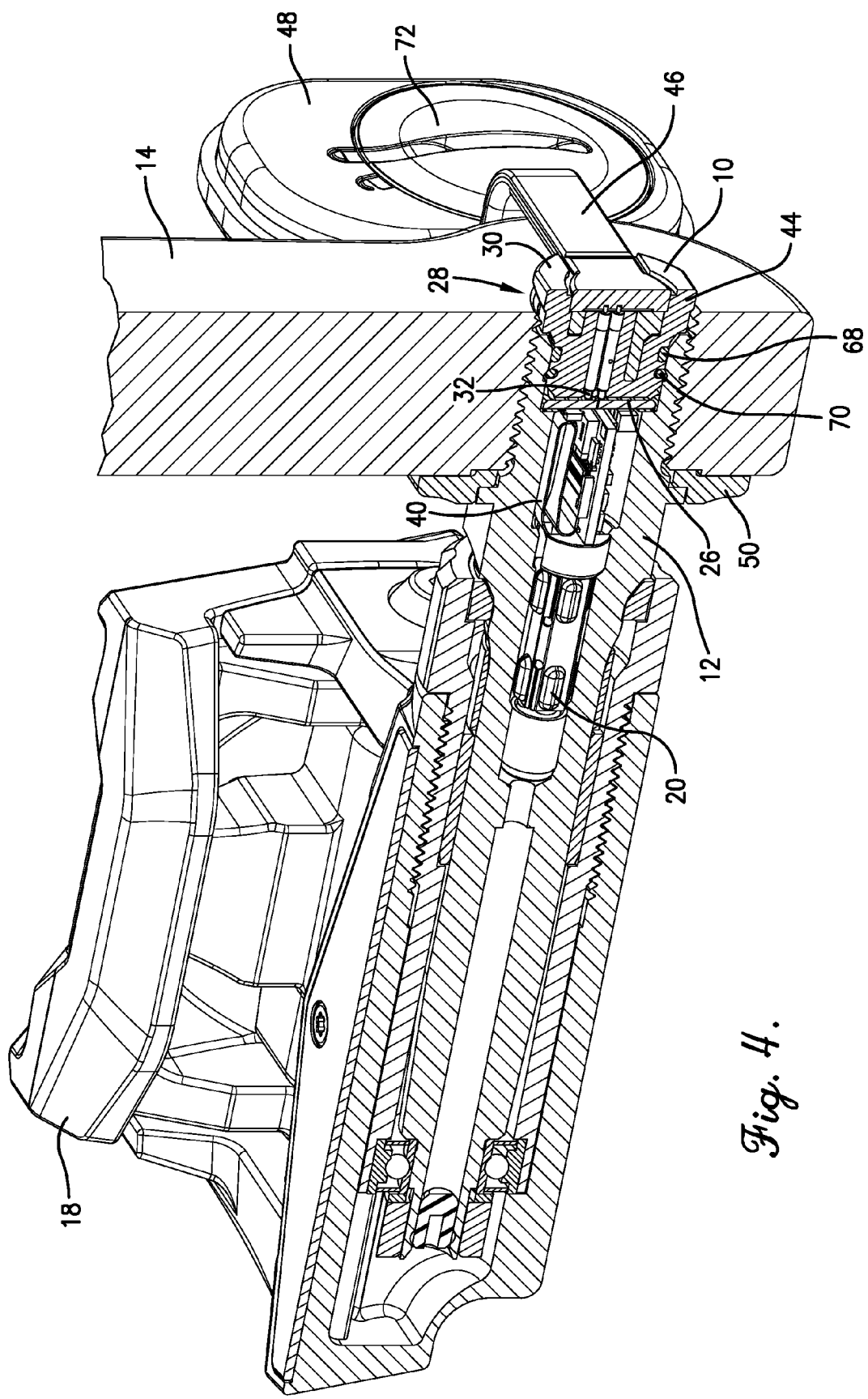
FIG. 4 is a cross-sectional perspective view of the pedal spindle, crank arm, and electrical connector of FIG. 2.

The electrical connector 10 may electrically couple sensors 20 within the spindle 12, as illustrated in FIG. 4, with a power source 22 and/or a communications device 24 outward of the spindle 12, as illustrated in FIG. 3. In some embodiments of the technology, as illustrated in FIG. 3, the spindle 12 may have a cavity or channel 38 formed into an inner surface of the spindle 12 to mate with retention elements of the electrical connector 10, as later described herein.

The sensors 20 illustrated in FIG. 4 may be strain gauges located within a hollow portion of the spindle 12 and may be configured to determine forces exerted by a cycles on a pedal of a bicycle. For example, the sensors 20 may comprise the sensor device described in U.S. Pat. No. 8,011,242, incorporated by reference herein above, including a plurality of sensors coupled to a substrate, and wiring coupled to the sensors and the substrate, all housed within the spindle 12. However, other sensors configured for placement within, on, and/or around the spindle 12 may be used without departing from the scope of the present technology. Thus, for example, the connector 10 may couple with electronics located inside the spindle 12, outside the spindle 12, outside the pedal 18, within the pedal 18, combinations thereof, and the like.

The power source 22 illustrated in FIG. 3 provides electrical power to the sensors 20 and/or the communications device 24 and may be directly or indirectly coupled therewith. The power source 22 may comprise conventional power supply elements, such as batteries, battery packs, etc. The power source 22 may also comprise power conduits, connectors, and receptacles operable to receive batteries, battery connectors, or power cables. For example, the power source 22 may include both a battery to enable portable operation and a power input for receiving power from an external source. Such positioning of the power source 22 enables users to easily replace batteries associated with the power source 22 without removing the pedal 18 or spindle 12.

The communications device 24 illustrated in FIG. 3 enables the sensors 20 to wirelessly communicate with communications networks utilizing wireless data transfer methods such as ANT, WiFi (802.11), Wi-Max, Bluetooth, ultra-wideband, infrared, cellular telephony, radio frequency, etc. For example, the communications device 24 may be a wireless transmitter. However, the communications device 24 may couple with a communications network utilizing wired connections, such as an Ethernet cable, and is not limited to wireless methods.

In addition to, or instead of, the power source 22 and communications device 24, the connector 10 may couple the sensors 20 with other electronics, such as displays, lights, processing and memory elements, other sensors, combinations thereof, and the like.

Figure 5:
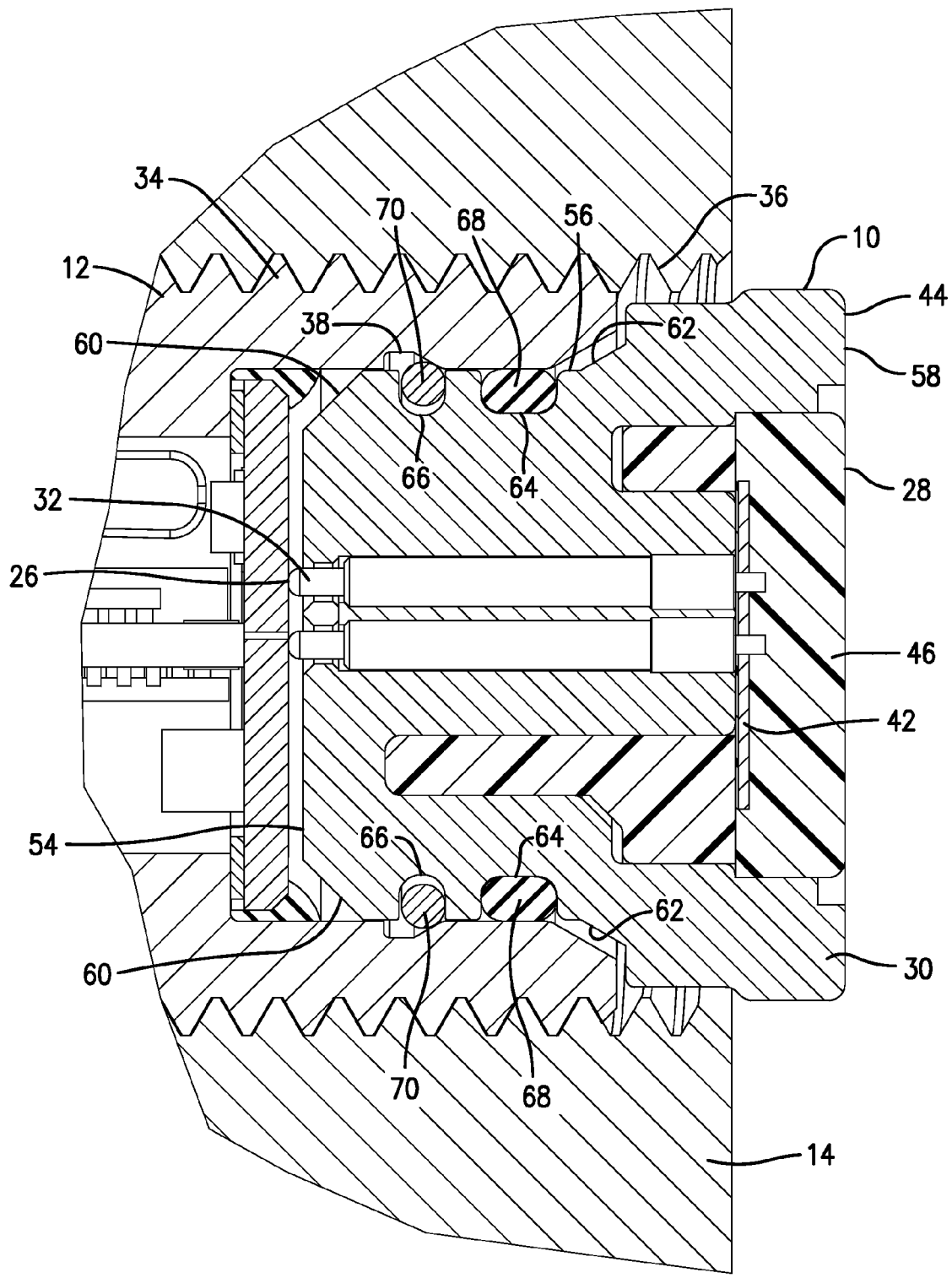
FIG. 5 is a fragmentary cross-sectional perspective view of the electrical connector of FIG. 2, illustrating pins of the electrical connector contacting electrical contact pads of the electrical connector.
Figure 6:
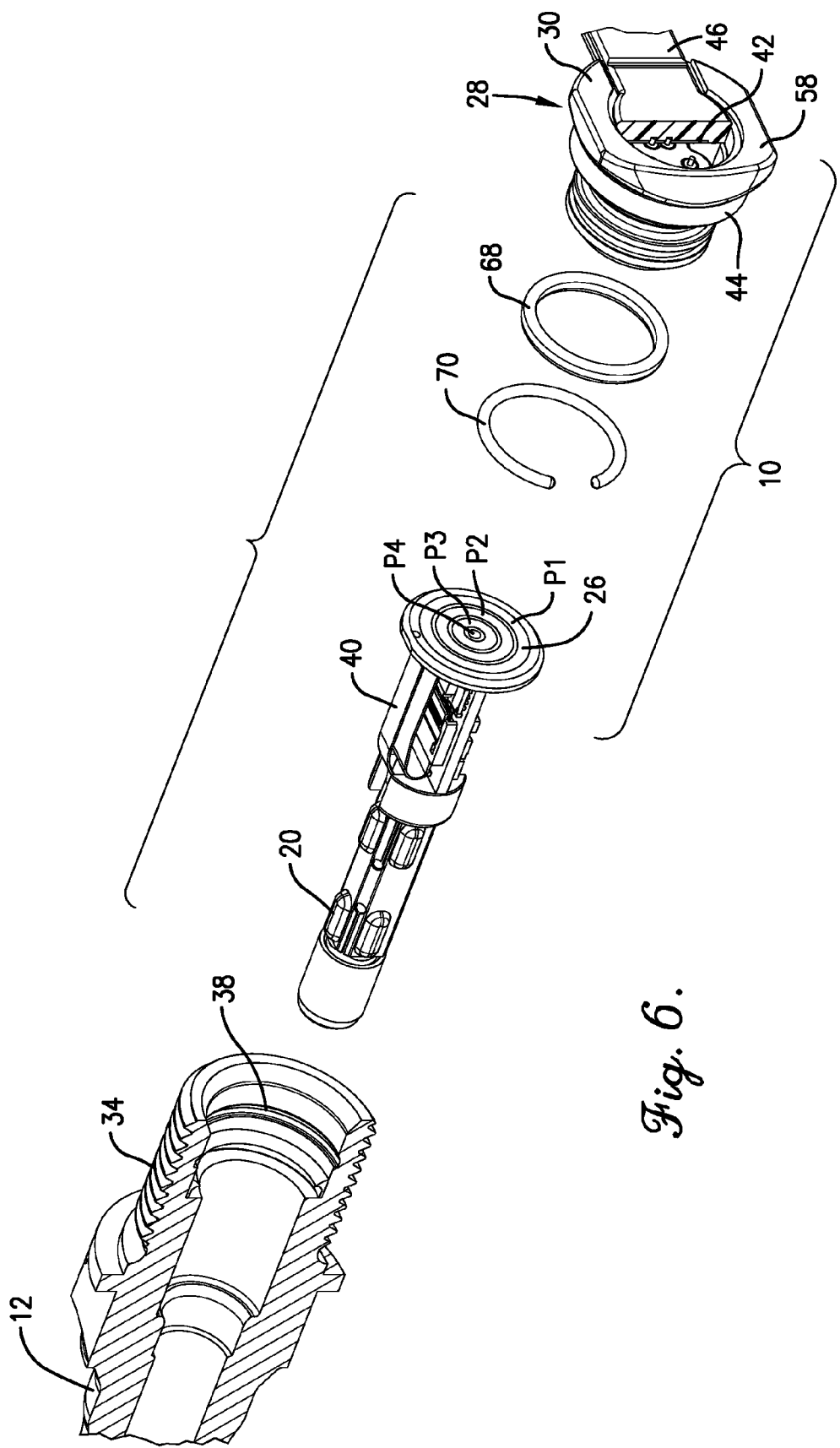
FIG. 6 is a fragmentary exploded perspective view of the electrical connector and pedal spindle of FIG. 2, illustrating the electrical contact pads of FIG. 5.

The electrical connector 10 broadly comprises electrical contact pads 26 disposed within the spindle 12 and a spindle connector 28 disposed outward of the spindle 12, as illustrated in FIGS. 3-7. The electrical contact pads 26 may be substantially continuous concentric circular electrical contact pads mounted on a circular circuit board or other non-conductive surface and electrically coupled with at least one of the sensors 20 associated with the spindle 12, as illustrated in FIGS. 3 and 6. For example, the electrical contact pads 26 may be two or more thin plates forming concentric rings spaced apart from each other and each made of an electrically conductive material. As illustrated in FIG. 6, an outer-most first one (P1) of the electrical contact pads 26 may have a greater diameter than a next adjacent second one (P2) of the electrical contact pads 26. Likewise, a third one (P3) of the electrical contact pads 26 may have a smaller diameter than the second one (P2) of the electrical contact pads 26. An inner-most fourth one (P4) of the electrical contact pads 26 may be circular, with or without a hole through its center. However, the electrical contact pads 26 may have other spaced apart, substantially concentric geometries of progressively smaller sizes without departing from the scope of the technology. In some configurations, at least one of the electrical contact pads 26 may be configured to connect to the sensors 20 to provide operational power thereto and another of the electrical contact pads 26 may be configured to send communication signals to and from the sensors 20. For example, conductive wires or conductive ribbons 40 may physically connect the electrical contact pads 26 with the sensors 20.

The spindle connector 28 may comprise a housing 30 and a plurality of pins 32 or other electrically-conductive elements configured to electrically contact the electrical contact pads 26 when the housing 30 is installed onto the spindle 12 and/or the crank arm 14. The housing 30 may be may be configured for mounting onto the spindle 12 and/or the crank arm 14 and may comprise generally conventional and durable materials, such as ABS, plastics, metals, or the like, to protect the enclosed and associated elements. The housing 30 may be of any size, shape, and configuration to house the pins 32, the power source 22, and/or the communications device 24, as illustrated in FIG. 3. Furthermore, the housing 30 may house conductive wires 42, as illustrated in FIG. 5, or other elements configured to transmit power and communication signals between the pins 32 and the power source 22 or the communications device 24. In some configurations, a plurality of discrete housings are employed to separately retain the pins 32 and other electronics such as the power source 22 and/or communications device 24.

In some embodiments of the technology, as illustrated in FIG. 3, the housing 30 may comprise a pin-housing portion 44 configured to house the pins 32 therein, a wire-housing portion 46 configured to house the conductive wires 42 therein, an electronics-housing portion 48 configured to house the power source 22 and/or the communications device 24 therein, and/or a durable attachment portion 50 having a hole 52 formed therethrough and configured to slide over a portion of the spindle 12 for attachment thereto. The pin-housing, wire-housing, and electronics-housing portions 44-48 may be made of plastic, rubber, or the like. The durable attachment portion 50 may be made of a rigid metal, such as the metal used to form the spindle 12. Furthermore, the housing 30 may be sized and configured to provide clearance to a bicycle chain.

The pin-housing portion 44 may have an inner face 54, a side face 56, and an outer face 58. The pins 32 may protrude from the inner face. The inner face 54 may face the electrical contact pads 26 when the spindle connector 28 is mounted to the spindle 12. The side face 56 may extend continuously between the inner face 54 and the outer face 58. For example, the side face 56 may be generally cylindrical and configured to fit within the threaded portion 34 of the spindle 12 when the spindle connector 28 is mounted to the spindle 12. The outer face 58 may be located outward of the spindle 12 when the spindle connector 28 is mounted to the spindle 12. The outer face 58 may occupy an area large enough to prevent the outer face 58 from being pushed into the spindle 12. The outer face 58 may also be configured for connecting to and/or receiving part of the wire-housing portion 46.

The side face 56 may have a first angled shoulder 60 extending outward from the inner face 54, a second angled shoulder 62 extending inward from the outer face 58, and two continuous, spaced apart channels 64,66 formed between the inner face 54 and the outer face 58. The first and second angled shoulders 60,62 may be chamfered faces having any angle relative to their adjacent surfaces and may aid in insertion within the spindle 12 and disconnect from the spindle 12. In some embodiments of the technology, the first angled shoulder 60 and the second angled shoulder 62 may each have an angle in the range of 10-degrees to 70-degrees relative to its adjacent inner face 54 or outer face 58. For example, the first and/or second angled shoulders may have a 30-degree angle relative to its adjacent inner face 54 or outer face 58.

The continuous, spaced apart channels 64,66 may comprise a first channel 64 and a second channel 66. The first channel 64 may be located closest to the outer face 58 and may have a gasket 68 placed therein and may extend therefrom to provide an environmental seal between the pin-housing portion 44 and the inner surface of the spindle 12. The second channel 66 may be located closest to the inner face 54 of the pin-housing portion 44 and may have a C-ring 70 placed therein. The C-ring 70 may be a thin, flexible ring of metal or plastic extending a majority of the way around the side face 56 of the pin-housing portion 44 within the second channel 66. The C-ring 70 may be sized and naturally biased to protrude from the second channel 66. However, when the side face 56 of the pin-housing portion 44 is forced into the spindle 12, ends of the C-ring 70 may be pushed together and the C-ring 70 may be pressed inward into the second channel 66 such that the side face 56 is allowed to slide into the spindle 12. Once the C-ring 70 is aligned with the cavity or channel 38 formed in the inner surface of the spindle 12, the C-ring 70 may spring back to its naturally-biased configuration, thereby retaining the inner face 54 and side face 56 of the pin-housing portion 44 within the spindle 12.

The wire-housing portion 46 may extend from the outer face 58 of the pin-housing portion 44 to the electronics-housing portion 48 and may be configured to house conductive wires, fiber optics, or other power and/or data cables therein, such as the conductive wires 42 illustrated in FIG. 5. The wire-housing portion 46 may be thin and flexible, such that the pin-housing portion 44 can be moved, pivoted, or rotated relative to an attachment point between the wire-housing portion 46 and the electronics-housing portion 48, toward and away from the hole 52 of the durable attachment portion 50 of the housing 30. For example, the wire-housing portion 46 may be a flex board having conductive pathways thereon and overmolded with rubber. The wire-housing portion 46 may be substantially resilient and angled such that in its normally-biased position, the wire-housing portion 46 aligns the pin-housing portion 44 with the hole 52 of the durable attachment portion 50. Specifically, a center axis of the inner face 54 of the pin-housing portion 44 may substantially extend through a center of the hole 52 of the durable attachment portion 50 when the wire-housing portion 46 is in its normally-biased position.

The electronics-housing portion 48 may be configured to house the power source 22 and/or the communications device 24 therein, and/or other electronics components, and may be fixed to the wire-housing portion 46 and the durable attachment portion 50 of the housing 30. The electronics-housing portion 48 may have screw holes formed therein for mechanically attaching the durable attachment portion 50 to the electronics-housing portion 48. Furthermore, the electronics-housing portion 48 may have other various cavities and compartments formed therein and configured for housing the power source 22 and/or the communications device 24, as illustrated in FIG. 3. In some embodiments of the technology, the electronics-housing portion 48 may comprise a removable cover 72 configured to be removed to replace the power source 22 and lockable to retain the power source 22 within a cavity of the electronics-housing portion 48.

The durable attachment portion 50 of the housing 30 may be a plate having the hole 52 formed therethrough near a first end of the plate and a cavity formed therein or walls extending therefrom to form a cavity for housing the electronics-housing portion 48, and/or the power source 22 and communications device 24, near a second end opposite of the first end of the plate. The hole 52 of the durable attachment portion 50 may be configured to receive the threaded portion 34 of the spindle 12 therethrough. The wall forming the cavity of the durable attachment portion 50 may have screw holes formed therethrough. When the electronics-housing portion 48 rests in the cavity, the screw holes of the durable attachment portion 50 and the screw holes of the electronics-housing portion 48 may align such that screws may extend therethrough and mechanically fix the electronics-housing portion 48 within the cavity of the durable attachment portion 50. However, other methods and mechanical devices for attaching the electronics-housing portion 48 with the durable attachment portion 50 of the housing 30 may be used without departing from the scope of the technology. For example, in some embodiments of the technology, the durable attachment portion 50 may be integrally formed of one-piece construction with at least part of the electronics-housing portion 48.

The pins 32 may be pogo pins or other independently resilient and/or spring-loaded pins configured to abut the electrical contact pads 26 when the spindle 12 is screwed into the crank arm 14. As described below, spring loading of the pins 32 (via pogo pins or other such functionality) provides installation tolerance for the connector 10. That is, the ability of the pins 32 to bend, retract, fold, or otherwise deform upon contact with the pads 26 enables sufficient electrical contact to be provided between the pins 32 and pads 26 even if the user does not fully insert the pin-housing portion 44 into the spindle 12.

In some embodiments of the technology, the pins 32 may have spherical or rounded tips. The pins 32 may protrude from holes formed through the inner face 54 of the pin-housing portion 44 of the housing 30. The pins 32 may each be spaced apart at different distances from an outer boundary of the inner face 54 of the pin-housing portion 44, and may each be configured to contact a different one of the electrical contact pads 26. For example, a center-most one of the pins 32 may be located at a center of the inner face 54 of the pin-housing portion 44, such that the center-most one of the pins 32 may contact a center-most one of the electrical contact pads 26 (e.g., the fourth one labeled P4 in FIG. 6). The other pins 32 may each be located radially outward from the center-most one of the pins, and may be, but are not required to be, radially aligned with each other. For example, the pins 32 may have a staggered configuration, as illustrated in FIG. 7, not aligned along a single radius of the inner face 54 of the pin-housing portion 44. In some alternative embodiments of the technology, multiple pins may be configured to contact a same one of the electrical contact pads 26, providing multiple contact points for transmitting power or data from a single contact pad to the power source 22 and/or the communications device 24.

The electrical connector 10 may be installed as follows. The electrical contact pads 26 may be electrically coupled with the sensors 20 and placed within the spindle 12. Thus, for example, the sensors 20 and pads 26 may be combined into an integrated unit that may be installed within the spindle 12. In some embodiments, the integrated unit is permanently affixed into the spindle 12, such as via potting, glue, or cement compounds, to substantially waterproof the sensors 20. In other configurations, the pads 26 may be discrete from the sensors 20 and installed separately. For example, the sensors 20 may be positioned on or around the pedal 18 while the pads 26 may be positioned inside the spindle 12 as discussed above.

Thus, the electrical contact pads 26 may be positioned within the threaded portion 34 of the spindle 12. The spindle connector 28 may then be attached to the spindle 12. For example, the threaded portion 34 of the spindle 12 may be inserted through the hole 52 of the durable attachment portion 50 of the housing 30. The spindle 12 may then be screwed into the crank arm 14. Due to the design of the connector 10, it is not necessary for the installing user to torque or screw the spindle 12 using a precise amount of force or turns.

Next, the pin-housing portion 44 of the housing 30 may be inserted within the spindle 12, compressing the C-ring 70 until the C-ring 70 is aligned with the cavity or channel 38 formed in the inner surface of the spindle 12. In this position, the pins 32 contact the electrical contact pads 26 within the threaded portion 34 of the spindle 12 and the crank arm 14 is sandwiched between the pin housing portion 44, the wire-housing portion 46, and the durable attachment portion 50 of the housing 30. The C-ring 70 therefore ensures that the pin-housing portion 44 has been sufficiently inserted into the spindle 12 such that the pins 32 may suitable contact the pads 26.

In some configurations, the electrical arrangement of the pedal spindle and the spindle connector may be reversed. For example, instead of the pins 32 being associated with the housing 30 and the pads 26 being associated with the spindle 12, the locations and/or positions of the pins 32 and pads 26 may be reversed such that the pins 32 are disposed within the spindle 12 and the pads 26 are positioned within, or on, the housing 30 such as within or on the pin-housing portion 44 (i.e., pad-housing portion in this example). Further, in some configurations, both the spindle 12 and housing 30 may be equipped with the same electrical components to enable electrical coupling therebetween, such that it is not necessary to use "male" and "female" electrical configurations.

Although the technology has been described with reference to the embodiments illustrated in the attached drawing figures, it is noted that equivalents may be employed and substitutions made herein without departing from the scope of the technology as recited in the claims.

What is claimed is:

1. An electrical connector for electronics associated with a pedal spindle, the electrical connector comprising:
   a plurality of concentrically-spaced electrical contacts configured to fit within the pedal spindle and to electrically connect to the electronics associated with the pedal spindle; and
   a spindle connector comprising:
      a housing configured to mate with an end of the pedal spindle proximate to the electrical contact pads, and
      a plurality of electrically conductive elements each configured to electrically connect with one of the concentrically-spaced electrical contacts when the housing is mated with the end of the pedal spindle.

2. The electrical connector of claim 1, the spindle connector further comprising at least one of a power source and a communications device positioned within the housing and electrically coupled with the conductive elements.

3. The electrical connector of claim 1, wherein the electrically-conductive elements include pogo pins or spring-biased pins individually movable in a direction toward and away from the housing.

4. The electrical connector of claim 1, wherein the electrically-conductive elements include pins with rounded tips.

5. The electrical connector of claim 1, wherein the electrical contact pads are formed onto or mounted on a circuit board sized to fit within the end of the pedal spindle.

6. The electrical connector of claim 1, the housing of the spindle connector further comprising a pin-housing portion from which the plurality of electrically conductive pins extend.

7. The electrical connector of claim 6, further comprising a gasket formed around the pin-housing portion and configured to form a seal between an inner surface of the pedal spindle and the pin-housing portion of the housing when the housing is mated with the end of the pedal spindle.

8. The electrical connector of claim 6, further including a C-ring, wherein the pin-housing portion includes a continuous channel and the C-ring is configured to mate with the continuous channel.

9. The electrical connector of claim 6, the housing of the spindle connector further comprising a wire-housing portion extending from the pin-housing portion and configured to house wires therein for electrically coupling the pins with the spindle connector.

10. The electrical connector of claim 9, the housing of the spindle connector further comprising an electronics-housing portion attached to the wire-housing portion and housing at least one of a power source and a communications device therein.

11. The electrical connector of claim 10, the housing of the spindle connector further comprising a durable attachment portion having a first end configured to receive a portion of the spindle and a second end fixed to the electronics-housing portion.

12. The electrical connector of claim 11, wherein the wire-housing portion is flexible relative to the electronics-housing portion and the durable attachment portion and is operable to move the pin-housing portion toward and away from a hole formed through the first end of the durable attachment portion.

13. A pedal apparatus comprising:
a hollow pedal spindle having a threaded portion configured to mate with a crank arm;
at least one sensor disposed within the pedal spindle; and
an electrical connector comprising:
   a plurality of concentrically-spaced electrical contact pads housed within the threaded portion of the pedal spindle and electrically connected to the at least one sensor, and
   a spindle connector comprising:
      a housing configured to mate with the threaded portion of the pedal spindle,
      a plurality of electrically conductive pins extending from the housing and each configured to contact one of the electrical contact pads when the housing is mated with the pedal spindle, and
      at least one of a power source and a communications device fixed within the housing and electrically coupled with the conductive pins.

14. The pedal apparatus of claim 13, the housing of the spindle connector comprising:
a pin-housing portion from which the plurality of electrically conductive pins extend;
a wire-housing portion extending from the pin-housing portion and flexibly housing wires therein, wherein the wires electrically couple the pins with at least one of the power source and the communications device;
an electronics-housing portion attached to the wire-housing portion and housing at least one of the power source and communications device therein; and
a durable attachment portion having a first end with a hole formed therethrough configured to receive a portion of the spindle and a second end fixed to the electronics-housing portion.

15. A pedal apparatus comprising:
a hollow pedal spindle having a threaded portion configured to mate with a crank arm, wherein a detent channel is formed into an inner surface of the threaded portion;
at least one sensor disposed within the pedal spindle; and
an electrical connector configured to mate with the pedal spindle, the electrical connector comprising:
   a plurality of circular, concentrically-spaced electrical contact pads housed within the hollow pedal spindle and electrically connected to the at least one sensor, and
   a spindle connector comprising:
      a housing configured to mate with the inner surface of the threaded portion of the pedal spindle, wherein a continuous channel is formed into the housing,
      a plurality of resilient or spring-biased, electrically conductive pins having rounded ends, extending from the housing, and each configured to contact one of the electrical contact pads when the housing is mated with the pedal spindle,
      at least one of a battery and a wireless transmitter fixed within the housing and electrically coupled with the conductive pins, and
      a C-ring at least partially seated in the continuous channel of the housing and having first and second ends, wherein the C-ring is sized and operable to be flexed such that the first and second ends move toward each other when the C-ring is pressed into the continuous channel, wherein the C-ring is configured to mate with the detent channel within the pedal spindle and thereby retain a portion of the housing within the pedal spindle.

16. The pedal apparatus of claim 15, the housing comprising:
a pin-housing portion from which the plurality of electrically conductive pins extend;
a wire-housing portion extending from the pin-housing portion and flexibly housing wires therein, wherein the wires electrically couple the pins with at least one of the battery and the wireless transmitter;
an electronics-housing portion attached to the wire-housing portion and housing at least one of the battery and the wireless transmitter therein; and
a durable attachment portion having a first end with a hole sized and configured for receiving the threaded portion of the pedal spindle and a second end fixed to the electronics-housing portion.

* * * * *